United States Patent Office 3,058,765
Patented Oct. 16, 1962

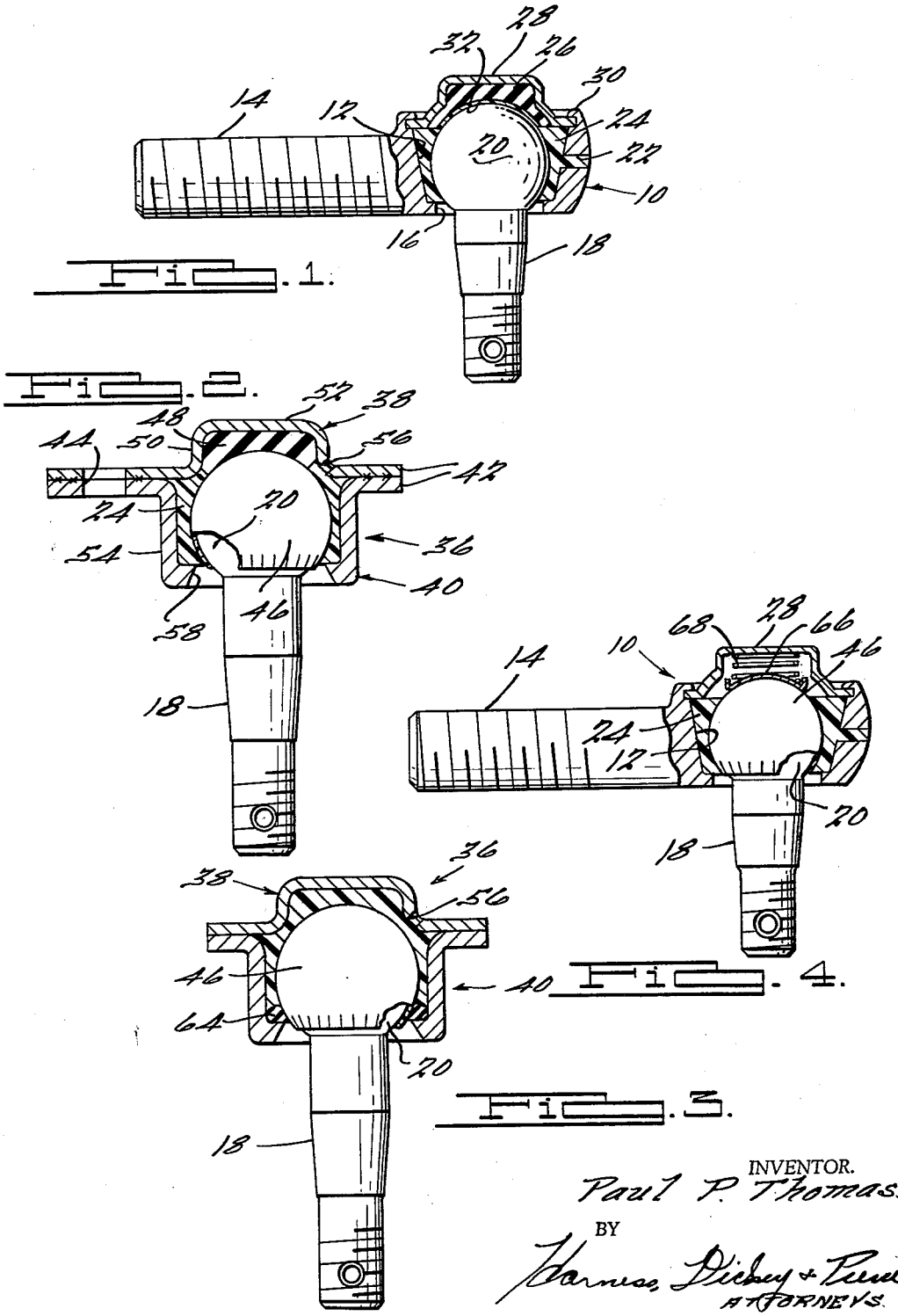

3,058,765
PRELOADED BALL JOINT ASSEMBLY
Paul P. Thomas, Detroit, Mich., assignor to American Metal Products Company, Detroit, Mich., a corporation of Michigan
Filed Sept. 19, 1958, Ser. No. 762,041
8 Claims. (Cl. 287—90)

The present invention relates to ball joint assemblies and particularly to a molded ball joint assembly which is preloaded to prevent the development of looseness or play after extensive use.

Ball joint assemblies have been developed wherein the ball on the end of a stud and ball is journaled for universal movement within a housing by a hardenable material, such as a suitable polyethylene molding compound, the hardenable material being disposed within the housing and molded to the surface of the ball. Ball joints of this type are disclosed in a copending application of Paul P. Thomas, Serial No. 680,293, filed on August 26, 1957, and assigned to the assignee of the present invention, and a copending application of Charles S. White, Serial No. 619,782, filed on November 1, 1956, under which the assignee of the present invention is an exclusive licensee, and reference is made to these applications for a complete description of such ball joints.

It has been found that after extensive use a certain amount of play or looseness may develop in ball joints of this type due to abnormal loading at the throat of the housing, causing excessive planishing of the hardenable material at the throat of the housing. Looseness or play may also develop from excessive loading at high frequencies of motion and fatiguing load reversals despite the fact that the hardenable material was initially very accurately molded directly to the surface of the ball.

It is one object of the invention to eliminate the development of play or looseness in a molded ball joint assembly.

It is another object of the present invention to provide a molded ball joint assembly having resilient means incorporated therein for maintaining the ball in tight engagement with the bearing material surrounding the ball even after extensive use.

It is a further object of the invention to eliminate the tendency of a molded ball joint to develop looseness or play in a relatively simply and inexpensive manner.

Other objects and features of novelty of the invention will be specifically pointed out or otherwise become apparent when referring, for a better understanding of the invention, to the following description taken in conjunction with accompanying drawings, wherein:

FIGURE 1 is a side view partially broken away of a ball joint assembly embodying features of the invention:

FIG. 2 is a sectional view of a ball joint assembly embodying other features of the invention;

FIG. 3 is a sectional view of a ball joint assembly embodying still other features of the invention; and FIG. 4 is a sectional view of a ball joint assembly embodying still other features of the invention.

Referring to FIG. 1, one embodiment of the invention is comprised of a forging 10 having an enlarged aperture 12 extending transversely through one end thereof and a threaded portion 14 on the other end thereof. The forging 10, as illustrated, is adapted to be connected to the end of a tie rod of a vehicle steering linkage system. It will observed that the forging 10 has an inwardly projecting annular flange 16 adjacent the bottom of the aperture 12 which defines a throat opening through which a stud 18 having a ball 20 on the upper end thereof extends, the ball 20 being disposed within the aperture 12.

Suitable hardenable material 24 may be injected through a hole 22 in the right end of the forging 10 so as to completely fill the annular space between the ball 20 and the forging 10. Of course, to accomplish this, suitable adapters would have to be positioned adjacent the bottom and top of the aperture 12 to close off the aperture in order to define a closed chamber in which the hardenable material 24 may be injected.

The hardenable material may be any suitable relatively low friction material that can be injected or otherwise positioned within the aperture 12 and molded to the ball 20 so that it will journal the ball within the aperture after it hardens. Of course, the hardenable material must have sufficient rigidity after hardening to withstand the particular application in which the ball joint assembly is used. Reference is made to the aforementioned copending application of Paul P. Thomas for a complete description of suitable hardenable materials and the manner in which they are injected within a housing so as to journal a ball within the housing for universal movement relative thereto.

As previously described, abnormal loading, fatiguing load reversals or excessive loading at high frequencies of motion may tend to planish or compact the hardenable material adjacent the throat of the aperture defined by the flange 16 so that some looseness or play may develop between the ball 20 and the hardenable material 24 molded thereabout. In order to eliminate this looseness or play in accordance with the present invention, a body of rubber or other resilient material 26 is held in engagement with the dome of the ball 20 by a cap 28 which is affixed to the top of the aperture 12 by spinning over the periphery of the upper end of the aperture 12 as at 30. The resilient material 26 is suitably preloaded or compressed so as to continuously exert a downward force on the ball 20 so that in the event the hardenable material adjacent the throat is compacted after extensive use, the preloaded resilient material 26 will prevent any looseness or play developing by maintaining the ball 20 in engagement with the hardenable material. Of course, the hardenable material 24 is mixed relative to the forging 10 as described in the aforementioned copending application of Paul P. Thomas by bonding or mechanically locking it thereto.

In order to reduce the friction between the dome of the ball and the resilient material 26, a layer of low friction material, such as Teflon, nylon or the like, may be disposed between the dome of the ball and the resilient material 26, the compressed resilient material 26 conforming the low friction material accurately to the dome of the ball. The surface of the ball may be provided with a chrome or other suitable finish to enhance its sliding relationship with the hardenable material and the low friction material 32, and, if desired, the low friction material 32 can be bonded to the resilient material 26.

Referring now to FIG. 2, another embodiment of the invention is illustrated wherein the ball 20 is disposed within a split housing 36 comprised of an upper stamping 38 and a lower stamping 40 each having flanges 42 thereof suitably joined together as by welding or the like. Suitable apertures 44 may be provided in the flanges 42 for connecting the housing 36 to other members, such as the chassis frame of an automotive vehicle.

In this embodiment, a layer of low friction material 46 is disposed about the ball 20 and a body of resilient material 48, such as rubber or the like, is positioned within the upper stamping 38 of the housing 36 under compression so as to conform the layer of low friction material 46 to the dome of the ball 20. It will be observed that the upper stamping 38 of the housing 36 has a cylindrical wall portion 50 and a top portion 52 which define a chamber for enclosing the resilient material 48, and that the lower periphery of the cylindrical wall portion 50 extends near the layer or low friction material so as to leave a minimum portion of the resilient material 48 exposed to the chamber defined by a cylindrical wall portion 54 of the lower stamping 40 of the housing 36. It is preferred that a small space be maintained between the wall portion 50 and the low friction material 46 to insure that the resilient material is suitably compressed despite variations in the size of the body of the resilient material 48 that may be encountered.

With this construction, the hardenable material 24 may be injected through an aperture 56 in the flange of the upper stamping 38 so as to completely fill the chamber defined by the cylindrical wall portion 54 and a radially inwardly extending flange 58 on the lower end thereof which defines the throat of the housing. The hardenable material conforms the layer of low friction material 46 to the surface of the ball 20 as previously described and is bonded or mechanically locked to the housing 36.

The extension of the cylindrical wall portion 50 of the upper stamping 38 of the housing near the layer of low friction material 46 as described, together with the compressive force of the resilient material 48, prevents the hardenable material from flowing between the resilient material 48 and the low friction material 46. But it is to be understood that this is merely a preferred construction since the resilient material 48 is firmly compressed against the layer of low friction material 46 so that it would be difficult for the hardenable material to penetrate therebetween even without the added obstacle provided by the cylindrical wall portion 50.

The low friction material 46 can be any suitable low friction material, but it is preferred that a Teflon boot, as described in the aforementioned copending application of Charles S. White, Serial No. 619,782, be employed, and reference is made to that application for a complete description of the Teflon boot layer of low friction material and the manner in which it is disposed about a ball and hardenable material injected thereabout. Briefly, the Teflon boot which can be used as the low friction material 46 of this application is comprised of a layer of woven Teflon cloth having a layer of cotton cloth affixed to one side thereof by interweaving at spaced points to form a compound layer of cloth. A thin layer of resin material is then bonded to the exposed face of the woven cotton cloth to provide a barrier surface, and the three layers are then formed into a boot which can be slipped over the ball 20 with the Teflon cloth engaging the surface of the ball. The hardenable material is then injected through the aperture 56 for accurately conforming the Teflon boot directly to the surface of the ball 20.

The resin material bonded to the cotton cloth acts as a barrier to prevent the penetration of the hardenable material through to the low friction surface provided by the Teflon cloth and also bonds the hardenable material to the cotton cloth, so that the Teflon cloth is fixed against movement relative to the hardenable material, it being well known in the art that Teflon, per se, is not bondable directly to other materials. As before, the hardenable material may be fixed against movement relative to the housing 36 by any suitable means, such as by bonding or mechanically locking it relative thereto. With this construction, the ball 20 is again urged downwardly with respect to the housing 36 to take up any play or looseness that may develop due to the compacting or planishing of the Teflon or hardenable material at the throat of the housing, and to insure an effective seal at the throat to prevent foreign material from entering between the ball and the Teflon to reduce the effective life of the unit. Of course, the aforementioned Teflon boot has enough flexibility so that it will not interfere with the ability of the preloaded resilient material 48 to maintain the ball in engagement with the hardenable material at the throat of the ball.

However, the present invention it not limited to the placement of the resilient material 48 adjacent the dome of the ball 20 since there are many applications in which the loading on the ball joint assembly is reversed, so that rather than pulling forces being exerted on the stud 18, the loading of the assembly is such that predominantly pushing forces are exerted thereon.

In this event, it is apparent that the teaching of the present invention could be similarly applied to this problem as illustrated in FIG. 3 wherein a ring 64 of the resilient material 48 is disposed adjacent the throat of the housing 36 and the hardenable material conforms the layer of low friction material 46 to the remaining surface of the ball 20 including the dome of the ball. Should the hardenable bearing material adjacent the dome of the ball be compacted or planished after extensive use, the ring 64 will prevent looseness or play developing as before. In addition, by positioning the ring of resilient material adjacent the throat of the ball, it serves as an effective seal for preventing foreign elements from working their way between the layer of low friction material 46 and the surface of the ball 20.

Referring to FIG. 4, another embodiment of the invention is illustrated wherein the hardenable material 24 is disposed about the ball to conform the layer of low friction material 46 to the ball and journal it within the end of the forging 10. A plate 66 is positioned against the dome of the ball and is continuously urged thereagainst by a coil spring 68 disposed between the plate 66 and the cap 28 covering the aperture 12. The plate conforms the layer of low friction material 46 to the dome of the ball and the spring exerts a downward force on the ball to prevent play developing in the event the hardenable material adjacent the throat of the ball is planished by pull-out forces exerted on the stud 18.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A ball joint assembly comprising a stud having a ball on one end thereof, a housing disposed about said ball, hard rigid material disposed within said housing and accurately conformed to the surface of said ball on both sides of the major diameter thereof, and resilient means within said housing for continuously exerting a force on said ball in one direction substantially along the axis of said stud to maintain said ball and hardenable material in engagement with one another.

2. A ball joint assembly comprising a stud having a ball on one end thereof, a housing disposed about said ball, resilient means disposed within said housing and acting between the dome of said ball and said housing, and hard rigid material disposed within said housing and accurately conformed to the remaining portion of the surface of said ball on both sides of the major diameter thereof.

3. A ball joint assembly comprising a stud having a ball on one end thereof, a layer of low friction material disposed about said ball, a housing disposed about said layer of low friction material and ball, hard rigid material disposed between said housing and said layer of low friction material, said hard rigid material being fixed relative to said housing and engaging said layer of low friction material on both sides of the major diameter thereof to accurately conform said layer of low friction material to the surface of said ball on both sides of the major diameter thereof, and resilient material within said housing continuously exerting a force on said ball in one direction substantially along the axis of said stud.

4. A ball joint assembly comprising a stud having a ball on one end thereof, a housing for said ball, a layer of low friction material disposed about said ball, hard rigid material disposed within said housing and engaging said layer of low friction material on both sides of the major diameter thereof so as to conform the low friction material to a portion of the surface of said ball on both sides of the major diameter thereof to journal the ball for universal movement relative to said housing, and a body of compressed resilient material disposed within said housing and engaging said low friction material adjacent the dome of said ball so as to conform the low friction material to the dome of the ball and to continuously exert a downward force on the ball.

5. A ball joint assembly comprising a stud having a ball on one end thereof, a layer of low friction material disposed about said ball, a housing disposed about said layer of low friction material and said ball, a portion of said housing lying closely adjacent said layer of low friction material in a generally circular line so as to divide the housing into two sections, a first section adjacent the dome of said ball and a second annular section completely surrounding the major diameter of the ball, compressed rubber material disposed within said first section of the housing and engaging said layer of low friction material so as to conform it to the dome of the ball and continuously exert a downward force on the ball, and hard rigid material disposed within said second section of the housing and engaging sadi layer of low friction material adjacent thereto on both sides of the major diameter thereof so as to accurately conform it to the remaining surface of the ball on both sides of the major diameter thereof to journal the ball for universal movement within said housing.

6. A ball joint assembly comprising a stud having a ball on one end thereof, a housing disposed about said ball, compressed resilient material disposed within said housing and acting on the dome of said ball to continuously exert a downward force thereon, a layer of low friction material disposed between said resilient material and the dome of the ball, and hard rigid material disposed within said housing and conforming to the remaining surface of the ball on both sides of the major diameter thereof to journal the ball for universal movement within said housing.

7. A ball joint assembly comprising a stud having a ball on one end thereof, a layer of low friction material disposed about said ball, a housing disposed about said layer of low friction material and ball having an opening through which the stud extends, compressed resilient material disposed within said housing adjacent said opening and engaging the low friction material adjacent thereto on both sides of the major diameter thereto so as to accurately conform the low friction material to the surface of the ball and exert an upward force on the ball, and hard rigid material disposed between said housing and the remaining portion of said layer of low friction material filling the space therebetween to conform the remaining portion of the low friction material to the surface of the ball on both sides of the major diameter thereof and journal the ball for universal movement within said housing.

8. A ball joint assembly comprising a stud having a ball on one end thereof, a housing disposed about said ball having an opening through which the stud extends, hard rigid material disposed about the dome and both sides of the major diameter of the ball to journal the ball within said housing for universal movement relative thereto, and a ring of resilient compressed material disposed between said housing and said hard rigid material adjacent to said opening for continuously exerting a force on the ball to maintain the dome thereof in engagement with the hard rigid material.

References Cited in the file of this patent

UNITED STATES PATENTS

| 2,853,326 | Booth | Sept. 23, 1958 |
| 2,861,827 | Langen et al. | Nov. 25, 1958 |
| 2,912,267 | Latzen | Nov. 10, 1959 |

FOREIGN PATENTS

| 777,002 | Great Britain | June 12, 1957 |
| 795,987 | Great Britain | June 4, 1958 |
| 796,615 | Great Britain | June 18, 1958 |